United States Patent [19]

Lawton

[11] Patent Number: 5,109,356

[45] Date of Patent: Apr. 28, 1992

[54] APPARATUS FOR COMPUTATION OF DISCRETE FOURIER TRANSFORM USING ARRAY PARALLEL PROCESSOR

[75] Inventor: Wayne M. Lawton, Somerville, Mass.

[73] Assignee: Environmental Research Institute of Michigan, Ann Arbor, Mich.

[21] Appl. No.: 530,099

[22] Filed: May 29, 1990

[51] Int. Cl.$^5$ .................... G06F 7/34; G06F 15/35
[52] U.S. Cl. ......................... 364/726; 364/728.02
[58] Field of Search ............ 364/726, 725, 728.01, 364/728.02

[56] References Cited

U.S. PATENT DOCUMENTS

| | | | |
|---|---|---|---|
| 4,215,401 | 7/1980 | Holsztynski et al. | 364/200 |
| 4,833,635 | 5/1989 | McCanny et al. | 364/728.01 |
| 4,929,954 | 5/1990 | Elleaume | 364/726 |

Primary Examiner—Gary V. Harkcom
Assistant Examiner—Long T. Nguyen
Attorney, Agent, or Firm—Krass & Young

[57] ABSTRACT

An apparatus for computing the discrete Fourier transform of a linear array variable $f(j)$ of length N or of a planar array variable $f(j,k)$ of dimensions N×M, wherein both N and M are even positive integers. The computation is divided into three parts, each suitable for computation via a multiprocessor array. Firstly, each element of the linear array $f(j)$ is multiplied by the corresponding element of a first array constant. The resultant array is circularly convolved with a second array constant in the second step. The circular convolution may be computed in a straight forward manner or the second array constant may be resolved into N-1 simple array constants which are successively convolved. Lastly, each element of the resultant array after convolution is multiplied by the corresponding element of a third array constant. The invention is applied to a planar array by loading the planar array $f(j,k)$ into corresponding elements of a planar array of processor elements. The above described process is first applied separately to the columns of the original planar array and then applied separately to the rows of the resultant planar array.

4 Claims, 7 Drawing Sheets

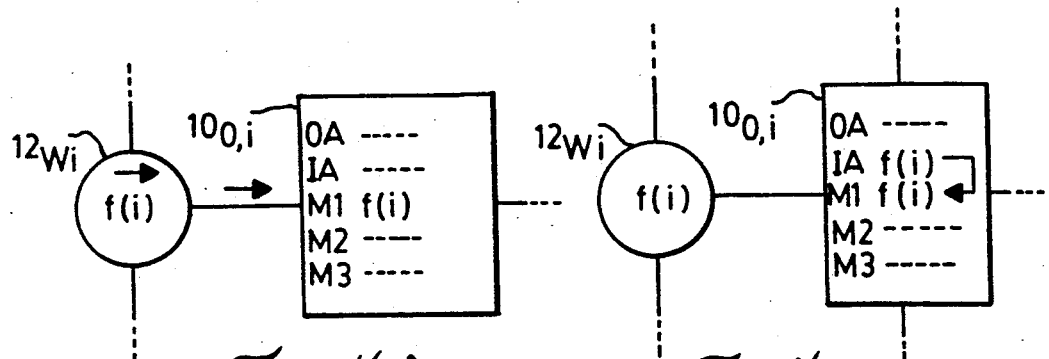
*Fig. 4b*  *Fig. 4c*
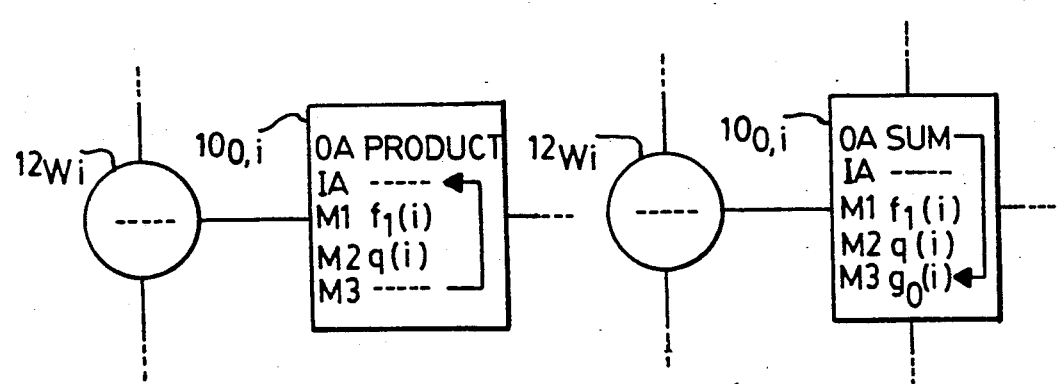
*Fig. 5a*  *Fig. 5b*
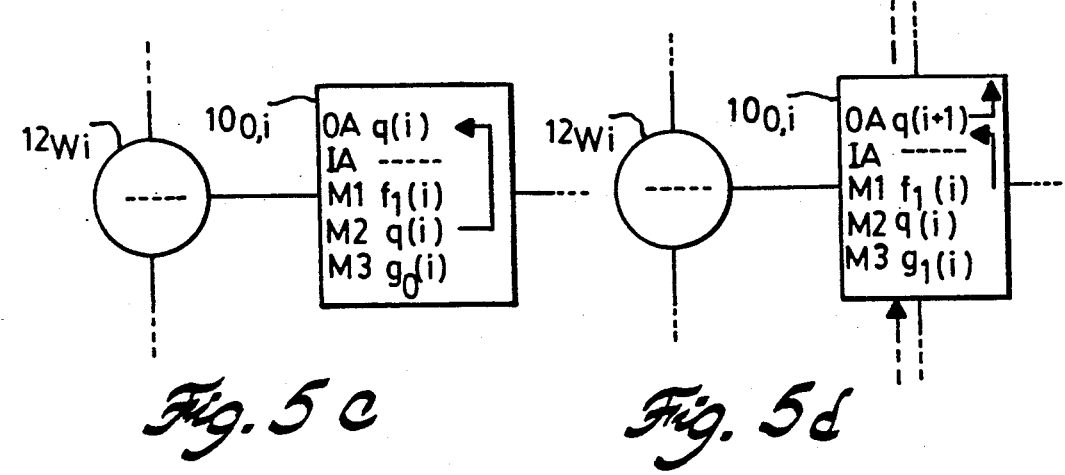
*Fig. 5c*  *Fig. 5d*

APPARATUS FOR COMPUTATION OF DISCRETE FOURIER TRANSFORM USING ARRAY PARALLEL PROCESSOR

TECHNICAL FIELD OF THE INVENTION

The technical field of the present invention is that of computation of Fourier transforms of discrete linear or planar complex functions.

BACKGROUND OF THE INVENTION

Discrete Fourier transforms are used extensively in the fields of image processing, synthetic aperture radar, signal processing and optics. Discrete Fourier transforms are analogous to Fourier transforms except that they are performed on sampled data rather than continuous data. In general the input data is either a linear or a planar array of complex numbers. In many prior applications, where discrete Fourier transforms are used they have been computed using the well known Fast Fourier Transform (FFT) algorithm. In some of these prior applications the time needed to implement the conventional Fast Fourier Transform algorithm is excessive. Thus prior applications required long times for the computation to be made via computer in a batch mode and precluded the possibility of real time processing. In addition the Fast Fourier Transform algorithm operates only for data of array lengths which are a power of two. This array length may not be convenient for the particular application. In many applications in these fields it would be desirable to perform hundreds of sequential discrete Fourier transforms. The prior art is incapable of making such computations in a timely manner. Therefore there is a need in the art to provide some means of performing discrete Fourier transforms in a more rapid manner.

SUMMARY OF THE INVENTION

The present invention is an apparatus for computing the discrete Fourier transform of a linear array variable f(j) or of a planar array variable f(j,k). This invention is practiced by dividing the computation of the discrete Fourier transform into three parts, each of which is suitable for computation via a multiprocessor array.

Computation of the discrete Fourier transform of a linear array f(j) of length N in accordance with the present invention requires computation of three array constants of length N. These three array constants are dependant solely on the length N of the linear array f(j). In a typical application of this invention many computations would be made with original arrays f(j) of the same size. Thus it would be helpful to precompute the three linear array constants and store them for use with multiple data arrays f(j).

The Fourier transform computation takes place in three steps. Firstly, each element of the linear array f(j) is multiplied by the corresponding element of the first array constant. The resultant array is convolved with the second array constant in the second step. Lastly, each element of the resultant array after convolution is multiplied by the corresponding element of the third array constant. This process is readily performed using a linear array of processor elements of length N, each of which is coupled to only its array neighbors.

There are two methods contemplated to perform the convolution computation. In the first embodiment the convolution is computed in a straight forward manner. This employs the array length connectivity of the linear array of processor elements to permit shifting of either the original array or of the second array constant between multiplications required in the summation. This method requires a certain minimum amount of memory be available at each processor element. In an alternative embodiment, the second array constant is resolved in $N-1$ simple arrays of the form $[1, \lambda_i, 0, 0, \ldots 0]$. The terms $\lambda_i$ are selected so that the second array constant is the convolution of these simple arrays. Because convolution is associative, the desired convolution computation can be performed by successive convolution with these simple arrays. The convolution of one of these simple arrays with either the original linear array f(j) or with any of the intermediate arrays is a sum of one element and the product of $\lambda_i$ with another element. Thus each of these convolutions is easily computed without the need for great amounts of memory within each processor element. This alternative embodiment does require computation of the terms $\lambda_i$ and their introduction into the processor array for each convolution.

The process of the present invention is adaptable to compute the discrete Fourier transform of a planar array variable f(j,k). The invention is applied to a planar array by loading the planar array f(j,k) into corresponding elements of a planar array of processor elements. The above described process is first applied separately to the columns of the original planar array. The above process is then applied separately to the rows of the resultant planar array.

BRIEF DESCRIPTION OF THE DRAWINGS

These and other objects and aspects of the present invention will become clear from the following description of the invention, in which:

FIGS. 4a, 4b and 4c illustrate in schematic form the operation of the processor elements in performing some of the operations of FIG. 3;

FIGS. 5a, 5b, 5c, 5d and 5e illustrate in schematic form the operation of the processor elements in performing other of the operations of FIG. 3;

FIGS. 7a, 7b, 7c, 7d and 7e illustrate in schematic form the operation of the processor elements in preforming some of the operations of FIG. 6.

DETAILED DESCRIPTION OF THE PREFERRED EMBODIMENTS

The problem solved by the present invention is the need for a rapid manner of computation of the discrete Fourier transform of a linear or planar array. Such computations have heretofore been made on ordinary sequential operation computers using a well known algorithm called Fast Fourier Transform.

The present invention is a manner of computation of discrete Fourier transforms on a special type of parallel processor network. This special network is of the type disclosed in Holsztynski et al U.S. Pat. No. 4,215,401 on Jul. 29, 1980 entitled CELLULAR, DIGITAL ARRAY PROCESSOR. In the Holsztynski et al patent simple processor elements are disposed in a planar array. Each processor element is connected only to the two immediate neighbors in its row and the two immediate neighbors in its column. The operation of the network is further restricted in that all the processor elements of the network perform the same operation simultaneously under commands from a central controller. These restrictions on the processor network greatly reduce the amount of interconnections required, thereby permitting construction of arrays including large numbers of these processor elements on a single integrated circuit, while not greatly restricting the kinds of computations that can be performed by the network.

Figure 1:
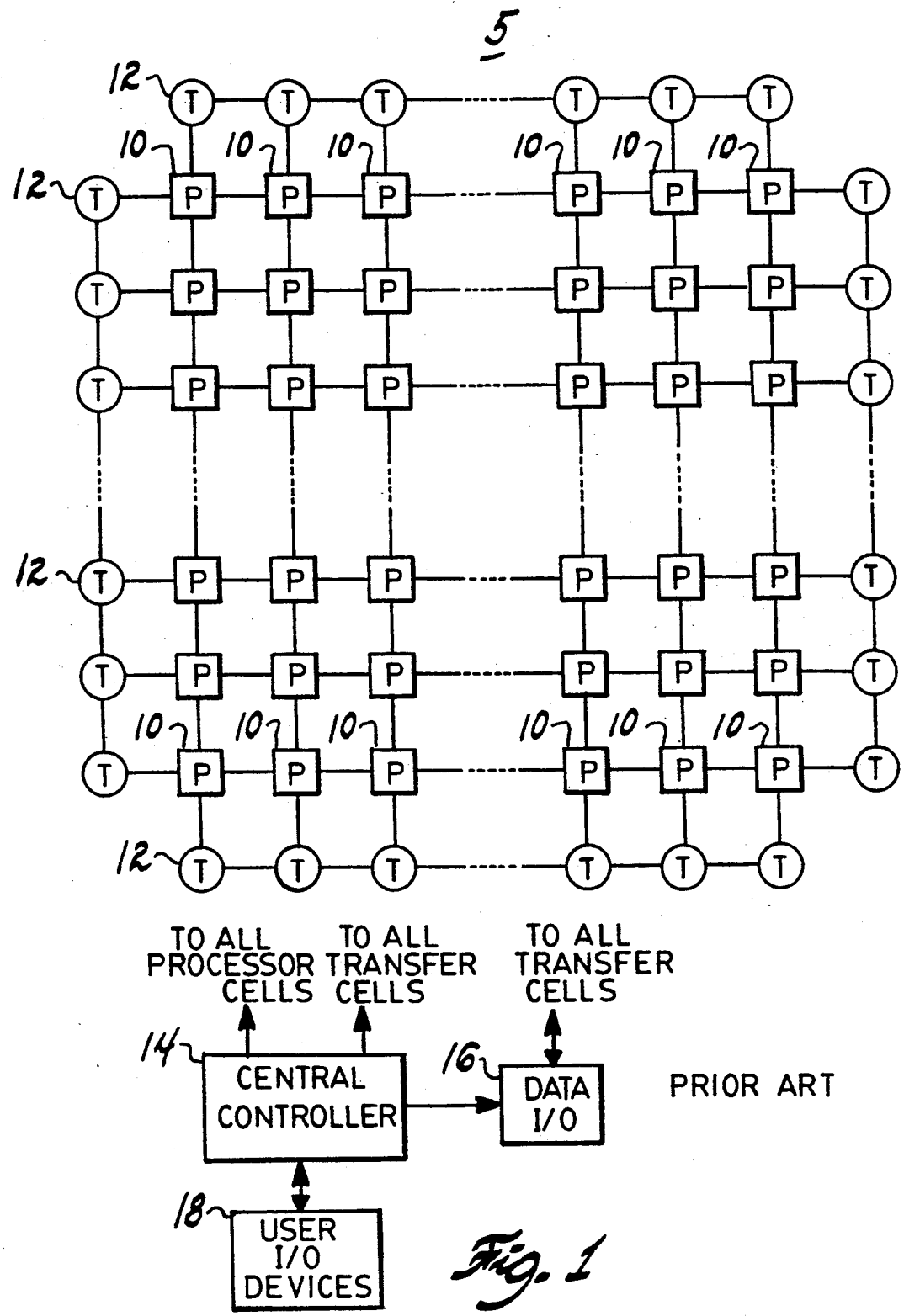
FIG. 1 illustrates a conceptual diagram of the parallel processor employed in the computation of the present application.

The preferred embodiment of the invention takes the form of a two dimensional array of processing cells 10, each denoted in FIG. 1 by the letter P. Each cell has interconnections with its immediate neighbors in the North, South, East and West directions. Thus, each cell 10 except those at the edges of the array has interconnections with four of its neighboring cells. The array of processing cells 10 is preferably very large and only the groups of cells in the four corners of the array are illustrated in FIG. 1.

The edges of the array are bounded by serial chains of data transfer cells 12 denoted by the letter T. These cells do not have a processing function but only operate to transfer data into and out of their connected processing cells 10. One transfer cell 12 is interconnected to each boundary cell of the array except those at the four corners of the array, which are interconnected to two of the transfer cells 12. All of the transfer cells bordering an edge of the array are interconnected to one another in a serial chain to allow data transfer between these cells.

A central controller 14 has interconnection to all of the processing cells 10 and all of the data transfer cells 12. Through its interconnection to the processing cells 10 the central controller determines the transfer of data within a cell and between interconnecting cells. Through its connection to the transfer cells 12 the central controller 14 determines the transfer of data between transfer cells and their interconnected processing cells and between the transfer cells themselves. The central controller also exercises control over a data input/output unit 16 which has data connections to all of the data transfer cells 12. This channel allows the transfer of data into and out of the processing array. Original data to be processed by the system is derived from user input/output devices 18 which are connected to the central controller and through the controller to the data input/output unit 16. The user devices may comprise keyboards, display devices and data sources and sinks including random access memories and bulk memories such as magnetic tape and the like.

Broadly, data to be processed is provided to the central controller 14 from appropriate I/O devices 18. The central controller 14 provides data in appropriate form to the input/output 16 and controls its provision to suitable data transfer cells 12. These transfer cells are then controlled by the controller 14 to transfer the data into their interconnected processing cells 10. Successive data transfer into the edge transfer cells and from the edge transfer cells to their neighboring processing cells are used to introduce an entire data matrix into the processor. The central controller 14 thus causes all of the processing cells 10 to simultaneously perform operations on the data under control of a program stored in the controller. A sequence of operations, including transfers between neighboring cells so that the cells may perform operations which are functions of the status of their neighbors, is controlled by the central controller. Following the completion of a series of processing operations the resulting data matrix may be extracted from the processing array through the edge transfer cells 12 and the I/O port 16 and provided as output to an appropriate user device 18.

Figure 2:
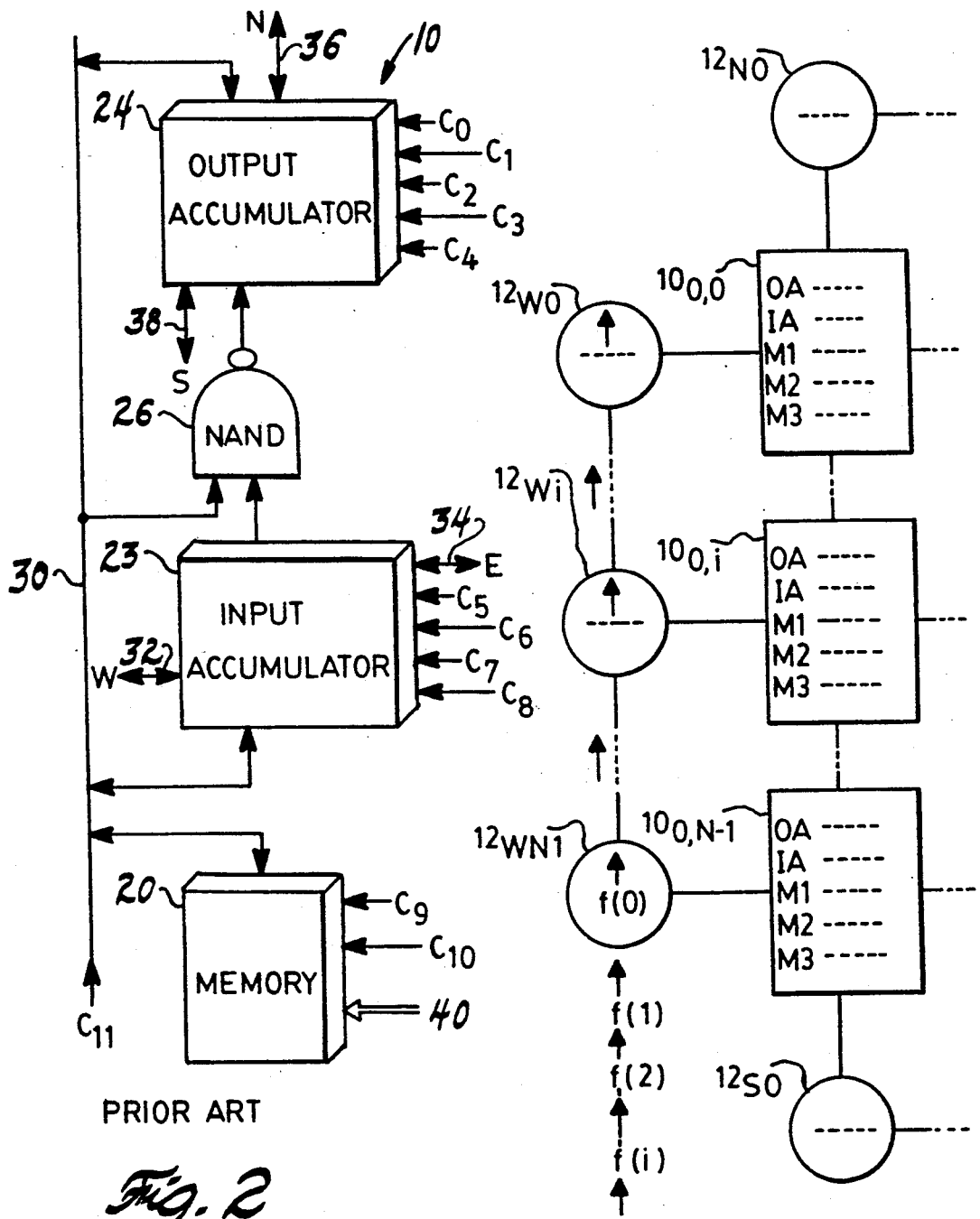
FIG. 2 illustrates a block diagram of one of the plural processors illustrated in FIG. 1.

The processing cells 10 are all identical and a typical processing cell employed in a preferred embodiment of the invention is illustrated in FIG. 2. The cell, generally indicated at 10, includes a random access memory 20; a single bit input accumulator 22; a single bit output accumulator 24; and a NAND processing gate 26. A data transfer bus 30 connects to the RAM 20 and the two accumulators 22 and 24 as well as to one input of the NAND gate 26. The second input of the NAND gate 26 is provided by the input accumulator 22. The output of the NAND gate 26 is provided to the output accumulator 24.

The input accumulator 22 has connections along lines 32 and 34 to a pair of neighboring cells in opposite directions. For purposes of reference the line 32 will be referred to as the interconnection with the West neighboring cell and the line 34 will be referred to as the interconnection with the East neighboring cells. The connection is a serial one and is bi-directional. The control data of the accumulator 22 may be transferred to either the East or West neighboring cells and information data from the East or West neighboring cells may be transferred to the input accumulator 22. To transfer data from the West cell to the East cell, or visa versa, the data must first be transferred to input accumulator 22.

Similarly, the output accumulator 24 is connected to two opposed neighboring processor cells 10 in a direction orthogonal to interconnections 32 and 34. For purposes of reference the output accumulator 24 will be termed as interconnected to the neighboring North cell via interconnection line 36 and to the neighboring South cell by interconnection line 38. In the case of boundary cells of the array, the interconnections may be to a data transfer cell 12 rather than to processor cells 10, but the interconnections are identical.

Each processor cell 10 interconnects with the central controller via 12 control lines designated $C_0$–$C_{11}$, as well as through a set of address lines 40 which control the address within the RAM access memory 20 that is connected to the bus 30. Control lines $C_0$–$C_4$ are connected to the output accumulator 24 and lines $C_5$–$C_8$ are connected to the input accumulator 22. Data transfer into and output of the accumulators 22 and 24 is conditioned by the status of lines $C_0$ through $C_8$. Control lines $C_9$ and $C_{10}$ provided to the RAM 20 determine whether data is written into or read out of the memory location addressed by the address lines 40. Control line $C_{11}$ determines whether the bus level is high or low.

The various possible operations of the processor cell 10 are determined by the specific conditions of the 12 command lines $C_0$–$C_{11}$. The action commanded by a high signal on a particular control line is as follows:

$C_0$: Accumulator 24 receives contents of accumulator 24 of South processor cell via line 38 while simultaneously transmitting contents to North unit cell via line 36.

$C_1$: Accumulator 24 receives contents of accumulator 20 of North processor cell via line 36 while simultaneously transmitting contents to South unit cell via line 38.

$C_2$: Store BUS 30 into accumulator 24.

$C_3$: Store NAND 26 output into accumulator 24.

$C_4$: Transfer contents of accumulator 24 to BUS 30.

$C_5$: Accumulator 22 receives contents of accumulator 22 of West processor cell via line 32 while simultaneously transmitting contents to East unit cell via line 34.

$C_6$: Accumulator 22 receives contents of accumulator 22 of East processor cell via line 34 while simultaneously transmitting contents to West unit cell via line 32.

$C_7$: Store BUS 30 into accumulator 22.

$C_8$: Transfer contents of accumulator 22 to BUS 30.

$C_9$: Transfer contents of RAM 20 designated by address lines 40 to BUS 30.

$C_{10}$: Store contents of BUS 30 into RAM 20 at the location designated by address lines 40.

$C_{11}$: Set BUS 30 to logical 1 otherwise leave BUS 30 at logical 0. Any command which transfers data to BUS 30 will override this command.

The operations of the processing cells 10 are sufficiently general so that with this simple command set and proper programming it will duplicate the action of any processor having a similar memory size no matter how complex a processing element is used in that comparative processor.

The present invention will first be described in conjunction with formation of the discrete Fourier transform of a linear array of N complex number elements f(k). By definition the Fourier transform $\hat{F}(y)$ of a one dimensional function f(x) is:

$$\hat{F}(y) = \int_{-\infty}^{+\infty} e^{-2\pi i x y} f(x) dx \quad (1)$$

where i is the fundamental imaginary number $\sqrt{-1}$. In the case of a sampled function f(j) having N complex number elements j=0 to N−1 the integral becomes a summation. The discrete Fourier transform $\hat{f}(k)$ is thus:

$$\hat{f}(k) = \sum_{j=0}^{N-1} e^{-2\pi i j k/N} f(j) \text{ for } k = 0 \text{ to } N-1 \quad (2)$$

Under the assumption that the array length N is an even integer (an assumption that will be made in the remainder of this application), then equation (2) can be expressed in the following algebraic identity:

$$\hat{f}(k) = e^{-\pi i k^2/N} \sum_{j=0}^{N-1} [e^{-\pi i j^2/N} f(j)] e^{\pi i (j-k)^2/N} \quad (3)$$

This algebraic identity of equation (3) is employed to divide the process of computing the discrete Fourier transform into three parts, each of which is suitable for performance in a set of N parallel processors. These three parts correspond to the three multiplications occurring in equation (3).

The first part of the algorithm of this invention involves the product inside the brackets within the summation. Each element of the original linear array f(j) is multiplied by the corresponding element of a first linear array constant p(j) of the same length N as follows:

$$f_1(j) = p(j) \times f(j) \quad (4)$$

where p(j) is a first linear array constant including elements j=0 to N−1 and is formed as follows:

$$p(j) = e^{-\pi i j^2/N} \quad (5)$$

Note that this linear array constant p(j) is solely dependent upon N. In a typical application of this invention many computations would be made with original arrays f(j) of the same size. Thus it would be helpful to precompute p(j) and store this array prior to introduction of the data f(j).

The second part of the discrete Fourier transform computation also involves an array constant of length N. This second array constant q(j) is formed as follows:

$$q(j) = e^{\pi i j^2/N} \quad (6)$$

This second array constant q(j), like the first, is solely dependant upon the array length N and is thus is also preferably precomputed.

The second portion of the computation is resolution of the summation. This summation is:

$$f_2(n) = \sum_{j=0}^{N-1} f_1(j) q(n-j) = f_1 * q(n) \quad (7)$$

As noted in equation (7), this is the same as the convolution of $f_1$ with q(n). This recognition that the summation is in the form of a convolution will be used in later discussions.

The third step resolves the multiplication outside the summation/convolution in equation (3). This requires computation of a third linear array constant r(j) of N elements where:

$$r(j) = e^{\pi i j^2/N} \quad (8)$$

As in the case of the first and second array constants, r(j) is solely dependent upon N and is preferably computed and stored prior to beginning the discrete Fourier transform computation. Each element of the third array constant r(j) is multiplied by the corresponding element of the intermediate linear array $f_2(n)$. The product is the desired discrete Fourier transform:

$$\hat{f}(k) = f_2(k) \times r(k) \quad (9)$$

In the present invention these N multiplications take place simultaneously.

In accordance with the present invention, this process for computation of the discrete Fourier transform is advantageously performed via the processor array 5 illustrated in FIG. 1. The following description will show how each of the three steps noted above are executed using this processor array 5. The flow chart illustrated in FIG. 3, together with the actions illustrated schematically in FIGS. 4a, 4b, 4c, 5a, 5b, 5c, 5d and 5e show how this is accomplished. In these Figures the data in the output accumulator 24 (OA), the input accumulator 22 (IA) and various memory locations within memory 20 (M1, M2 and M3) are illustrated schematically. These illustrations help to explain the operation of processor array 5 in performing the discrete Fourier transform.

Figure 3:
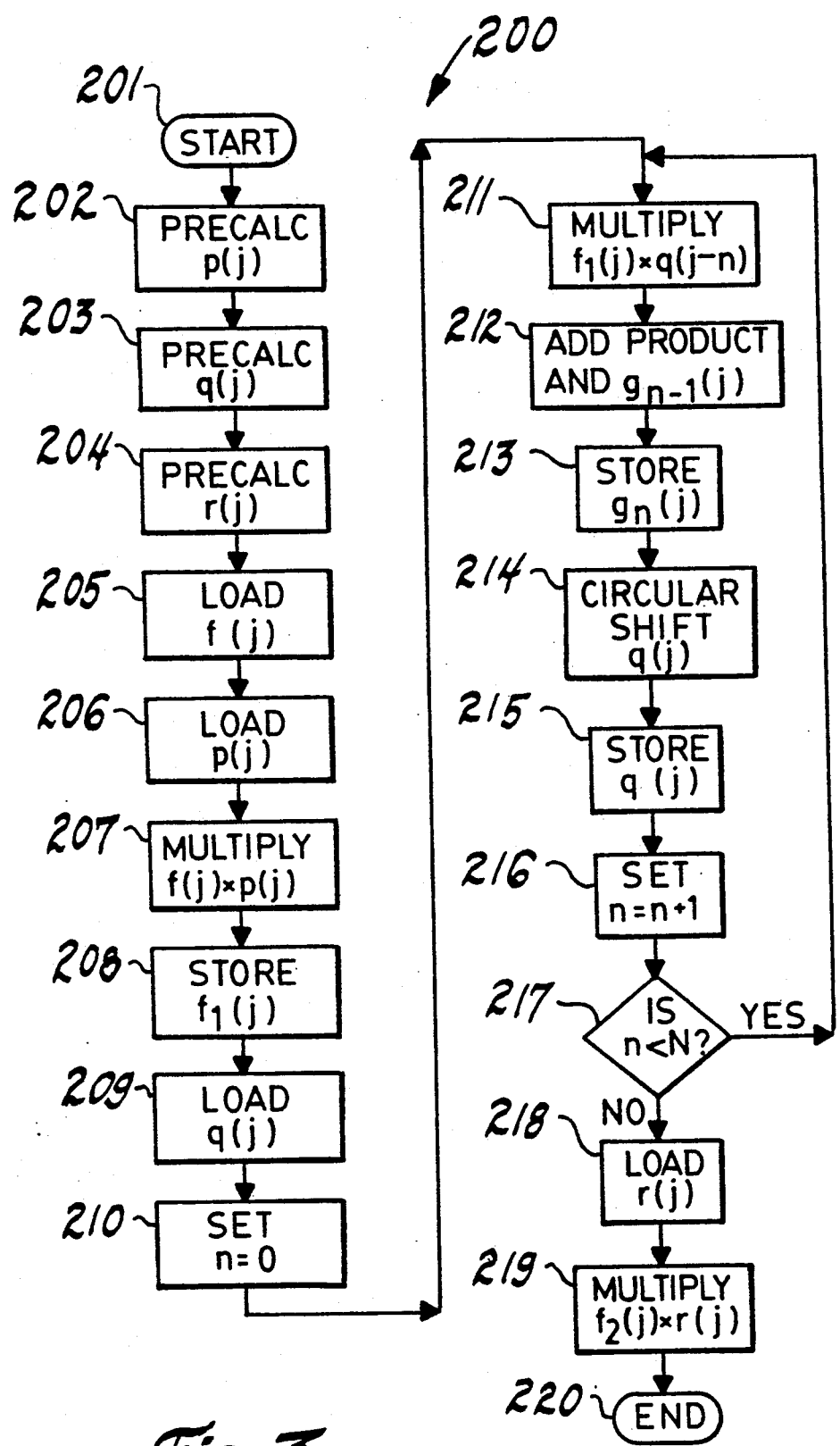
FIG. 3 illustrates in flow chart form the method of calculation of the discrete Fourier transform of a linear array of complex numbers.

Program 200 illustrated in FIG. 3 is begun with start block 201. Firstly, the three array, constants p(j), q(j) and r(j) are precomputed (processing blocks 202, 203 and 204). These values are stored in central controller 14 for introduction into processor array 5 at the proper time.

Note that these three array constants need not be independently computed. Firstly, each element of p(j) and r(j) are identical, therefore only a single computation is needed for these two arrays. Secondly, each element of q(j) is the complex conjugant of the corresponding element of p(j), thus the elements of q(j) can be computed by merely inverting the imaginary part of the corresponding element of p(j). Lastly, the linear array constant p(j) is periodic in N. This is shown as follows:

$$
\begin{aligned}
p(j + N) &= e^{\pi i(j+N)2/N} \\
&= e^{\pi i(j^2+2jN+N^2)/N} \\
&= e^{\pi ij^2/N} \times e^{\pi i(2jN+N^2)/N} \\
&= p(j) \times e^{2\pi i(j+N/2)} \\
&= p(j)
\end{aligned}
\tag{10}
$$

The expression $e^{2\pi i(j+N/2)}$ equals 1, because $e^{2\pi iL}=1$ for any integer L, and $j+N/2$ is an integer since j is an integer and N is an even integer. Thus $p(N-j)=p(-j)$ for all j from 0 to N. This means that only about N/2 complex number terms need be calculated and stored for the three linear array constants.

Next the linear array f(j) is loaded into the first column of the processor elements 10 (processing block 205) This process is illustrated in FIGS. 4a, 4b and 4c. The individual elements of the array are shifted into the West transfer cells $12_{W0}$ to $12_{WN-1}$ in order as illustrated in FIG. 4a. Next the data stored in the West transfer cells $12_{W0}$ to $12_{WN-1}$ are shifted into the first column of processor elements $10_{0,0}$ to $10_{0,N-1}$ as illustrated in FIG. 4b. In accordance with the construction of the individual processor elements 10 illustrated in FIG. 2, this transfer process is into the input accumulators 22. Lastly, the data in the input accumulators 22 is stored in the first memory location M1 within memory 20 as illustrated in FIG. 4c. Note that the central controller 14 specifies the address for this memory store operation via address bus 40.

Program 200 next loads the precomputed array constant p(j) (processing block 206). This process is identical to the loading of the original data f(j) as illustrated in FIGS. 4a, 4b and 4c, except that this array constant p(j) is stored in a second memory location M2 within each processor element 10.

A multiplication is then preformed simultaneously in all of the processor elements $10_{0,0}$ to $10_{0,N-1}$ (processing block 207). Each processor element $10_{0,j}$ performs the multiplication $f(j) \times p(j)$ to form the corresponding element $f_1(j)$ of a new array. Note that this multiplication operation in general is a complex process including numerous addition and shift steps which are not detailed here. Those skilled in the computer arts would recognize that each processor element 10 is capable of being controlled to perform such a multiplication in a manner known in the art. Note that this multiplication takes place with all of the processor elements $10_{0,0}$ to $10_{0,N-1}$ simultaneously performing the same function, a requirement of the processor array 5 of FIG. 1. The resultant elements $f_1(j)$ are stored in the first memory location M1 of each processor element 10 (processing block 208) replacing the corresponding element f(j) of the original array.

Program 200 next begins the computation of the summation/convolution of equation (7). In general this computation would require calculation of the elements of the third linear array constant q(j) for all j from $-N+1$ to $N-1$ and require an array of length 2N-31 1. However, in the same manner as previously discussed with regard to equation (10), q(j) is periodic with period N and thus $q(-j)=q(N-j)$. This means that this summation/convolution computation can be made with a circular convolution of q(j) of length N because the terms of q(j) for $-N+1 \leq j < 0$ required in the summation/convolution correspond to computed terms in the range of $0 \leq j \leq N-1$.

Firstly, the array constant q(j) is loaded (processor 209) in the same manner as previously described. The elements of array constant q(j) are preferably stored in the second memory location M2 replacing the first array constant p(j) which is no longer needed. Next a loop variable n is set to zero (processing block 210). In the preferred embodiment this loop variable is tracked within central controller 14. This loop variable n is employed to control the number of times program 200 executes a loop in computing the summation/convolution.

Resolution of this summation/convolution involves multiple multiplications and additions. Each element of the intermediate array $f_1(n)$ must be multiplied by each element of the second array constant q(j), thus requiring $N^2$ multiplications. In this invention all the elements of $f_1(j)$ are simultaneously multiplied by a corresponding element of q(j). The products are separately accumulated and then the correspondence between elements of $f_1(j)$ and q(j) is shifted to prepare for another multiplication. This process is repeated until N sets of simultaneous multiplications have been performed. This process insures that each of the required multiplications of equation (7) are performed. By this means the $N^2$ multiplications are made in N multiplication cycles using N processors.

Every processor element $10_{0,0}$ to $10_{0,N-1}$ operates to multiply $f_1(j)$ by q(j) (processing block 211). This is achieved in the manner previously described. The resultant products are stored in the corresponding output accumulators 24. Next the contents of the third memory location M3 are recalled into the input accumulator 22. This process in illustrated schematically in FIG. 5a. In the case of the first pass through the loop the memory location M3 is empty so this process recalls the number zero. These two numbers are added (processing block 212) and the resulting product appearing in the output accumulator 24 is designated $g_1(j)$. This sum is then stored in the memory location M3. FIG. 5b illustrates this process schematically for the 0-th pass through the loop.

Figures 5E, 7A:
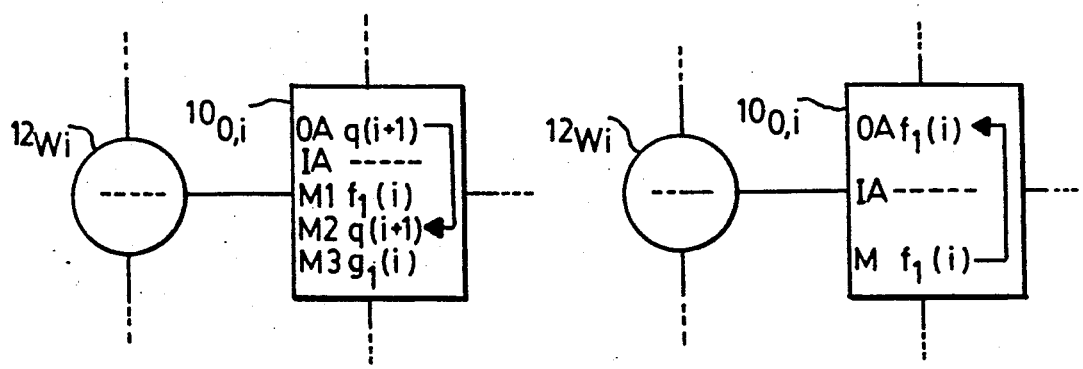

Next program 200 circularly shifts the elements of q(j) are along the column of processor elements $10_{0,0}$ to $10_{0,N-1}$ to (processing block 214). FIGS. 5c, 5d and 5e illustrate this process. First, the contents of memory location M2 are transferred to the output accumulator 24 as illustrated in FIG. 5c. Then the contents of the output accumulators 24 are circularly shifted as illustrated in FIG. 5d. Note that the first element of the array constant q(0) is shifted into the output accumulator 24 of the last processor element $10_{0,N-1}$. Program 200 then stores the shifted elements of the array constant q(j) into the memory location M2 of the corresponding processor element $10_{0,0}$ to $10_{0,N-1}$ (processing block 215). This is illustrated in FIG. 5e.

Each processing element $10_{0,0}$ to $10_{0,N-1}$ is then ready for the next pass through the loop. Central controller 14 increments the loop variable n (processing block 216) and tests to determine if n is less than N (decision block 217). If this is the case then the loop is not complete and control passes to processing block 211. This repeats the multiplication of $f_1(j)$ by the corresponding element of q(j).

This loop is executed N times. This results in the array constant q(j) being shifted to every location, resulting in N multiply and add steps. This computes the summation/convolution of equation (7). The processor elements $10_{0,0}$ to $10_{0,N-1}$ now have the corresponding elements of $f_2(j)$, corresponding to the last intermediate array $g_{N-1}(j)$, stored in the memory location M3.

The processing block 214 illustrated in FIG. 5b show that the array constant q(j) is shifted North between each multiply and add process. This is not the only manner of computing the summation/convolution of equation (7). Those skilled in the art would realize than the array constant q(j) could just as easily have been shifted South with the same net result. In addition, it is also feasible to shift the array $f_1(j)$ either North or South for each pass through the multiplication loop. The summation/convolution of equation (7) requires the sum of the product of every element of array $f_1(j)$ by every element of q(j) and this can be accomplished by any of these methods.

Program 200 next loads the array constant r(j) (processing block 218). This is done in the manner previously described. Next every processor element $10_{0,0}$ to $10_{0,N-1}$ multiplies the corresponding element of $f_2(j)$ stored in memory location M3 by the corresponding element of the array constant r(j) (processing block 219). The resultant product is the elements of the desired discrete Fourier transform $\hat{f}(k)$. This product is within the processor elements $10_{0,0}$ to $10_{0,N-1}$ in the proper order. Thus the computation is complete and program 200 is terminated via end block 220. The computed discrete Fourier transform $\hat{f}(k)$ may be read out of the processor array 5 or retained within processor array 5 for further processing.

The above described process requires a number of memory locations for each processor element 10. It is feasible to employ another technique and reduce the need for memory at each processor element. This takes advantage of the fact that the summation/convolution of equation (7) is in the form of a convolution and the fact that convolution is an associative operation, that is the order of execution of a set of convolution operations is immaterial. This process requires that there exist N−1 array constants of the form:

$$B_1 = [1, \lambda_1, 0, 0, \ldots 0] \quad (11)$$
$$B_2 = [1, \lambda_2, 0, 0, \ldots 0]$$
$$\vdots$$
$$B_{N-1} = [1, \lambda_{N-1}, 0, 0, \ldots 0]$$

where $\lambda_1, \lambda_2, \ldots \lambda_{N-1}$ are complex numbers selected to make the following equation valid:

$$q = B_1 * B_2 * B_3 * \ldots * B_{N-1} \quad (12)$$

where q is the second array constant.

It is possible to show that there always exists a set $\lambda_1, \lambda_2, \ldots \lambda_{N-1}$ which satisfies equation (12). Let $$B_1 * B_2 * B_3 * \ldots * B_{N-1} = [C_0, C_1, \ldots C_{N-1}] \quad (13)$$

By straight forward calculation we find that $$\begin{aligned}
C_0 &= 1 \\
C_1 &= \lambda_1 + \lambda_2 + \ldots + \lambda_{N-1} \\
C_2 &= \lambda_1\lambda_2 + \lambda_1\lambda_3 + \ldots \lambda_2\lambda_{N-1} + \lambda_2\lambda_3 + \ldots \\
&\vdots \\
C_{N-1} &= \lambda_1\lambda_2\ldots\lambda_{N-1}
\end{aligned} \quad (14)$$

By inspection we determine that the $C_i$'s are the coefficients of the polynomial of the variable z:

$$(z + \lambda_1)(z + \lambda_1)\ldots(z + \lambda_1) = \quad (15)$$
$$C_0 z^{N-1} + C_1 z^{N-2} + \ldots C_{N-2} z + C_{N-1}$$

From equation (12) the selected values $\lambda_1, \lambda_2, \ldots \lambda_{N-1}$ must satisfy the equation:

$$C_j = q(j) \text{ for all } j=0 \text{ to } N-1 \quad (16)$$

This is equivalent to selecting each $\lambda_j$ to satisfy the polynomial equation:

$$P(-\lambda_j) = 0 \text{ where } P(z) = \sum_{j=0}^{N-1} q(j) z^{n-j-1} \quad (17)$$

Thus the numbers $\lambda_1, \lambda_2, \ldots \lambda_{N-1}$ are the negatives of the roots of the polynomial:

$$P(z) = z^{N-1} + e^{\pi i/N} z^{N-2} + e^{\pi i 4/N} z^{N-3} + \ldots + \quad (18)$$
$$e^{\pi i(N-2)2/N} z + e^{\pi i(N-1)2/N}$$

From Gauss' fundamental theorem of algebra we know that the polynomial P(z) has exactly N−1 roots if the roots are counted with multiplicity. Thus there exists values $\lambda_1, \lambda_2, \ldots \lambda_{N-1}$ which can satisfy the constraint on the basic arrays $B_1, B_2 \ldots B_{N-1}$. Note that both the basic arrays $B_1, B_2 \ldots B_{N-1}$ and the values $\lambda_1, \lambda_2, \ldots \lambda_{N-1}$ are dependent solely on the length N of the array to be transformed. Thus these constants are advantageously precalculated prior to the computation of the desired Fourier transforms.

The above mathematics proves that there exists the basic arrays $B_1, B_2 \ldots B_{N-1}$. From equation (12) we know that equation (7) can be expressed as:

$$f_2(n) = f_1 * B_1 * B_2 * B_3 * \ldots * B_{N-1} \quad (19)$$

a sequence of N−1 convolutions with the basic arrays $B_1, B_2 \ldots B_{N-1}$. Each of these convolutions can be easily performed by N parallel processors such as the array of processor elements $10_{0,0}$ to $10_{0,N-1}$ illustrated in FIG. 4a. By definition the convolution of $f_1$ and $B_1$ is:

$$f_1 * B_1(j) = \begin{cases} f_1(j) + \lambda_1 f_1(j-1) \text{ if } j \geq 1 \\ f_1(0) + \lambda_1 f_1(N-1) \text{ if } j = 0 \end{cases} \quad (20)$$

The other convolutions in equation (18) are computed in a similar manner.

Figure 6:
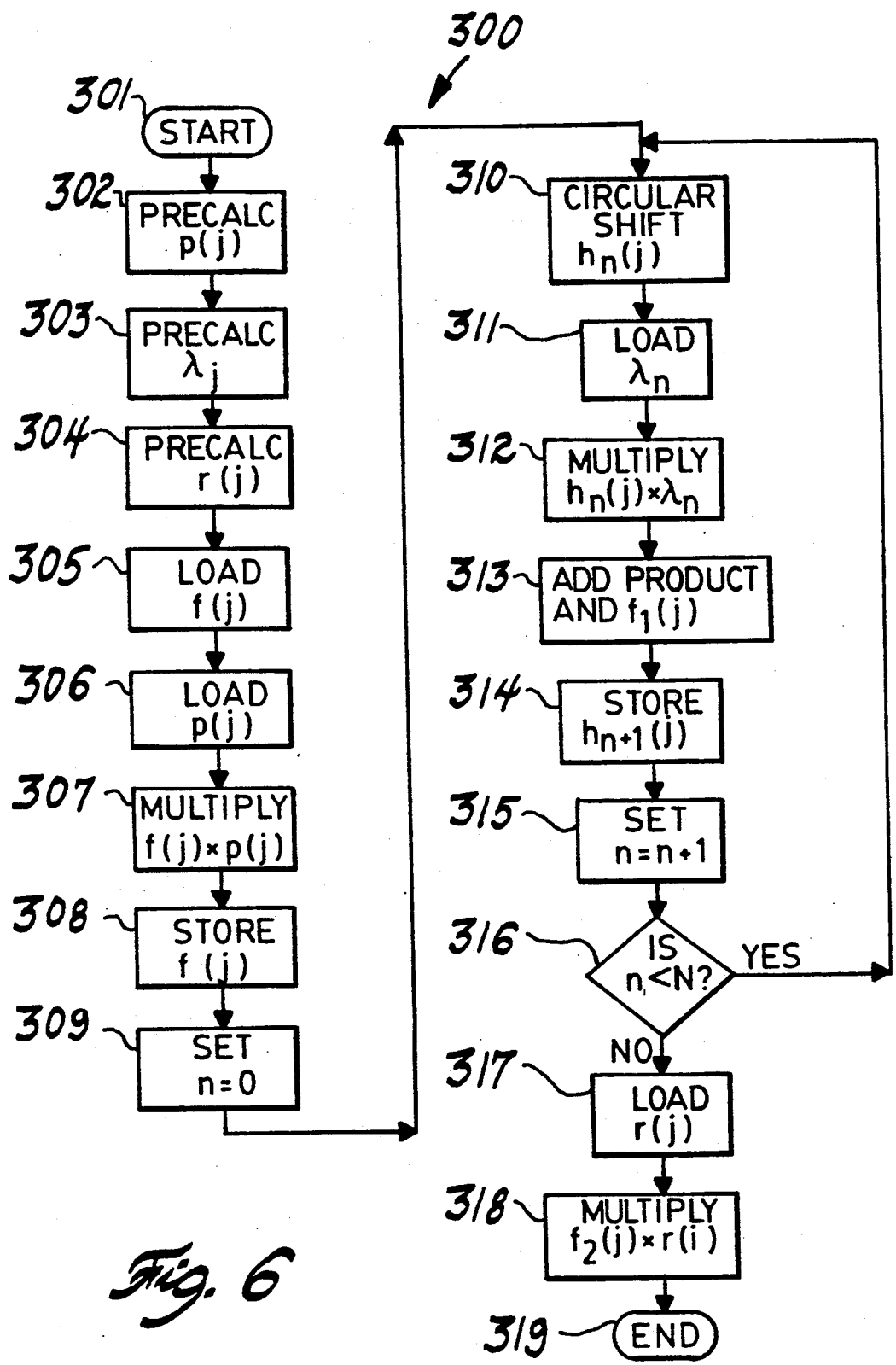
FIG. 6 illustrates in flow chart form an alternative method of calculation of the discrete Fourier transform of a linear array of complex numbers.

The flow chart illustrated in FIG. 6, together with the actions illustrated schematically in FIGS. 7a, 7b, 7c, 7d and 7e show how this alternative computation is accomplished. In FIGS. 7a, 7b, 7c, 7d and 7e the data in the output accumulator 24 (OA), the input accumulator 22 (IA) and a single memory location M within memory 20 are illustrated schematically. These illustrations help to explain the operation of processor array 5 in performing this alternative of the discrete Fourier transform.

Program 300 illustrated in FIG. 6 is similar to program 200 illustrated in FIG. 3. Firstly, program 300 is begun with start block 301. The array constants p(j) is precomputed (processing block 302), the constants $\lambda_j$ are precomputed (processing block 303) and the array constant r(j) is precomputed (processing block 304). Next the linear array f(j) is loaded 10 into the corresponding memory locations M (processing block 305). Program 300 next loads the precomputed array constant p(j) (processing block 306).

Each processor element $10_{0,j}$ multiplies $f(j) \times p(j)$ to form the corresponding element $f_1(j)$ of a new array (processing block 307). The resultant elements $f_1(j)$ are stored in the memory location M of each processor element 10 (processing block 308) replacing the corresponding element f(j) of the original array.

Figures 7B, 7C:
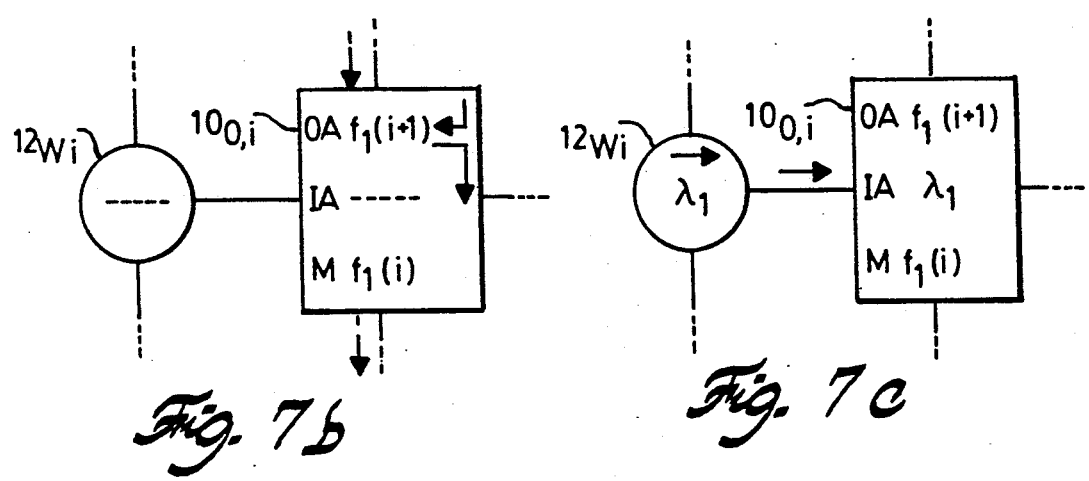

Program 300 next begins the computation of the summation/convolution of equation (7). Firstly, a loop variable n is set to zero (processing block 309). Then the loop is begun by recalling and circularly shifting down the data $h_n(j)$ in the memory M (processing block 210). This process is shown schematically in FIGS. 7a and 7b. The content of memory M is first loaded into the output accumulator 24 as shown in FIG. 7a. Then the contents of all output accumulators 24 are shifted South as shown in FIG. 7b. Note that the data h (N−1) in the last processor element $10_{0,N-1}$ is supplied to the first processor element $10_{0,0}$. Also note that the data $h_1(j)$ for the first pass through the loop is the previously calculated $f_1(j)$. This prepares the processor array 5 for performing the computation in equation (19).

Figures 7D, 7E:
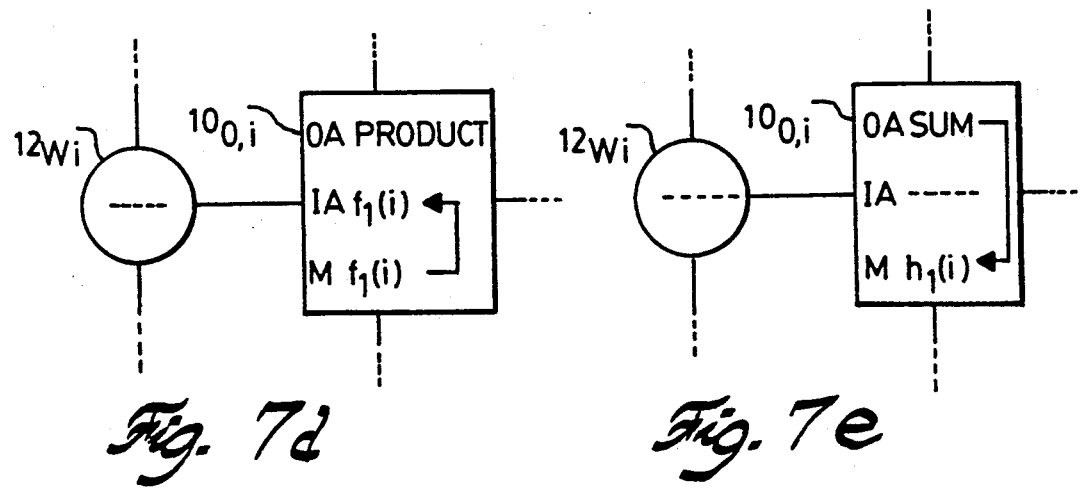

Next program 300 loads the constant $\lambda_n$ into the input accumulator 22 of each processor element $10_{0,0}$ to $10_{0,N-1}$ (processing block 311). This process is illustrated schematically in FIG. 7c. Next the contents of the output accumulator 22 are multiplied by the contents of the input accumulator 24 (processing block 312). The content of the memory M is summed with this product (processing block 313). This is accomplished by moving the data in the memory to the input accumulator 24 as illustrated in FIG. 7d. These numbers are then summed. The resultant sum is stored in the memory as the new intermediate value $h_{n+1}(j)$ (processing block 314). This is illustrated in FIG. 7e. This completes the computation of equation (19) for the corresponding array $B_n$.

Central controller 14 next increments the loop variable n (processing block 315) and tests, to determine if n is less than N−1 (decision block 316). If this is the case then the loop is not complete and control passes to processing block 210. This computes the convolution of $h_n(j)$ with the next array $B_n$.

Once the convolution has been formed with each of the arrays $B_1, B_2 \ldots B_{N-1}$, program 300 loads the array constant r(j) (processing block 317). Next every processor element $10_{0,0}$ to $10_{0,N-1}$ multiplies each element of $f_2(j)$ stored in the memory M by the corresponding element of the array constant r(j) (processing block 318). The resultant product is the elements of the desired discrete Fourier transform $\tilde{f}(k)$. The computation is complete and program 300 is terminated via end block 220.

The same type of computation can be employed to determine the discrete Fourier transform of a planar array of N complex number elements f(j,k). This process is illustrated in program 400 illustrated in FIG. 8. This requires an array of processor elements 10 at least as large as the planar array f(j,k). Thus if planar array f(j,k) is N by M elements, processor array 5 must include N by M processor elements 10 disposed in N rows of M columns. The process described amounts to separately determining the discrete Fourier transform of each column of the planar array f(j,k) and then separately determining the discrete Fourier transform of each row of the resultant. This produces the desired Fourier transform of the planar array.

Figure 8:
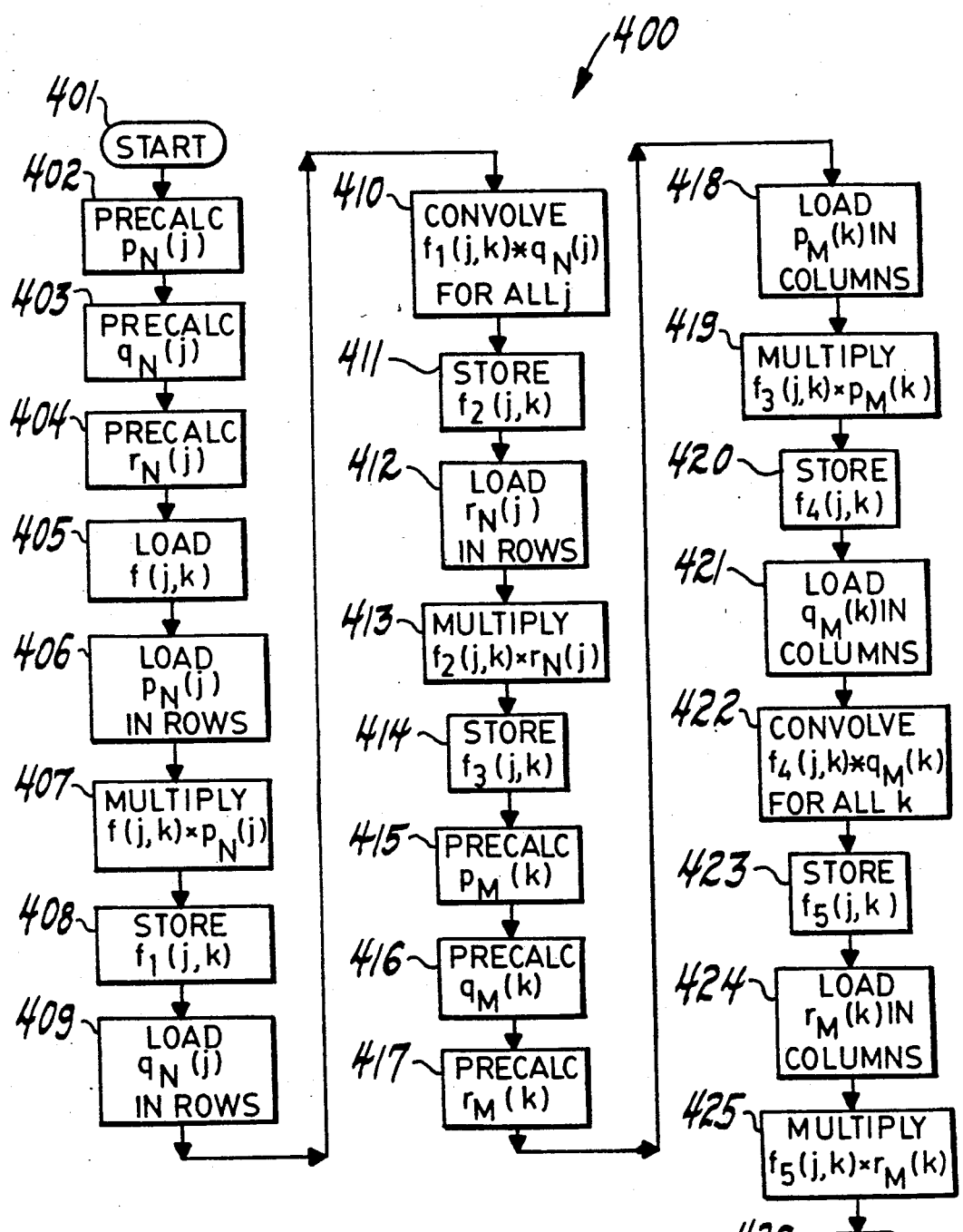
FIG. 8 illustrates in flow chart form the method of calculation of the discrete Fourier transform of a planar array of complex numbers.

Program 400 illustrated in FIG. 8 is begun with start block 401. The three array constants $p_N(j)$, $q_N(j)$ and $r_N(j)$ are precomputed (processing block 402, 403 and 404). As previously described these array constants are a function of N alone. Next the planar array f(j,k) is loaded into corresponding processor elements 10 (processing block 405). Program 400 next loads the precomputed array constant $p_N(j)$ into each column of the processor array 5 (processing block 406).

Each processor element 10 multiplies $f(j,k) \times p_N(j)$ to form the corresponding element $f_1(j,k)$ of a new planar array (processing block 407). This is performed simultaneously within all the processor elements 10. The loading of the first array constant $p_N(j)$ into each column of processor array 5 permits these N×M multiplications to be performed simultaneously. The resultant elements $f_1(j,k)$ are stored in the memory 20 of each corresponding processor element 10 (processing block 408) replacing the elements f(j,k) of the original array.

Program 400 next loads the second linear array constant $q_N(j)$ into each of the columns (processing block 409). Program 400 next separately computes the convolution of each column of $f_1(j,k)$ and $q_N(j)$ (processing block 410). This takes place in the manner described above in conjunction with blocks 210 to 217 illustrated in FIG. 3. The N by M elements of processor array 5 permits these convolutions to be computed simultaneously. The resultant elements of planar array $f_2(j,k)$ are stored in memory 20 of the corresponding processor elements 10 (processing block 411) replacing the elements of the prior planar array $f_1(j,k)$.

Program 400 next loads the array constant $r_N(j)$ (processing block 412) into each of the columns of the processor array 5. This is done in the manner previously described. Next every processor element 10 multiplies the element of $f_2(j,k)$ stored in memory 20 by the corresponding element of the array constant $r_N(j)$ (processing block 413). The resultant is stored as the elements of a third intermediate planar array $f_3(j,k)$ (processing block 414.) This completes the first half of the Fourier transform process.

Program 400 next separately forms the discrete Fourier transform of the rows of the third intermediate array $f_3(j,k)$. This is similar to the process already described for the columns. The three array constants $p_M(k)$, $q_M(k)$ and $r_M(k)$ are precomputed (processing block 415, 416 and 417). These new array constants are different from those computed in processing blocks 402, 403 and 404 because these linear array constants are a function of M. Thus these three array constants $p_M(k)$, $q_M(k)$ and $r_M(k)$ equal the corresponding prior array constants $p_N(j)$, $q_N(j)$ and $r_N(j)$ only if N and M are equal. Program 400 next loads the precomputed array constant $p_M(k)$ into each row of the processor array 5 (processing block 418) and then each processor element 10 multiplies $f_3(j,k) \times p_M(j)$ to form the corresponding element $f_4(j,k)$ of a new planar array (processing block 419). The resultant elements $f_4(j,k)$ are stored in the memory 20 of each processor element 10 (processing block 420) replacing the corresponding elements of the intermediate array $f_3(j,k)$.

Program 400 next loads the fourth linear array constant $q_M(k)$ into each of the rows (processing block 421). Program 400 next separately computes the convolution of each row of $f_4(j,k)$ and $q_M(k)$ (processing block 422). The resultant elements of planar array $f_5(j,k)$ are stored in memory 20 of the corresponding processor elements 10 (processing block 423) replacing the elements of the prior planar array $f_1(j,k)$.

Program 400 next loads the array constant $r_M(k)$ (processing block 424) into each of the rows of the processor array 5. Every processor element 10 multiplies the corresponding element of $f_5(j,k)$ stored in memory 20 by the element of the array constant $r_M(k)$ (processing block 425). The resultant is the corresponding elements of the desired discrete Fourier transform. Program 400 is complete and is exited via end block 426.

The process of forming the inner convolution can be performed in each of the columns and rows as illustrated in FIG. 6. Thus the central controller can precompute the values $\lambda_{N1}, \lambda_{N2}, \ldots \lambda_{NN-1}$ for the N rows and the values $\lambda_{M1}, \lambda_{M2}, \ldots \lambda_{MM-1}$ for the M columns. Each of these values would be loaded into every cell of processor array 5 and the 112 computation would take place in the manner described in blocks 309 to 316 illustrated in FIG. 4.

I claim:

1. An apparatus for computing a discrete Fourier transform of a linear array f(j) of N complex number elements where N is an even integer, said apparatus comprising:

a set of N transfer cells disposed in a linear array, each transfer cell connected to its array neighbors and capable of storing therein a complex number;

a set of N processors disposed in a linear array from a Northmost processor to a Southmost processor, each processor except said Northmost processor having a North array neighbor, each processor except said Southmost processor having a South array neighbor, and each processor including a memory having an input, an output and an address input, said memory capable of storing a complex number at a memory location corresponding to the address applied to said address input and capable of recalling a complex number stored at a memory location corresponding to the address applied to said address input, an input accumulator capable of storing data therein, said input accumulator having a first interconnection line bidirectionally connected to the corresponding transfer cell for data transfer therebetween, a second interconnection line and an output, a logic element having first and second inputs, said second input connected to said output of said input accumulator, and having an output, said logic element for performing a predetermined logic combination of data received at said first and second inputs and producing resultant data at said output, an output accumulator capable of storing data therein, said output accumulator having first, second and third interconnection lines, said first interconnection line bidirectionally connected to said second interconnection line of said output accumulator of said North array neighbor for data transfer therebetween, said second interconnection line bidirectionally connected to said first interconnection line of said output accumulator of said South array neighbor for data transfer therebetween, said first interconnection line of said output accumulator of said Northmost processor bidirectionally connected to said second interconnection line of said output accumulator of said Southmost processor, said output accumulator further having an input connected to said output of said logic element, and a bus bidirectionally connected to said memory line said input and said output of said memory, bidirectionally connected said second interconnection line of said input accumulator and bidirectionally connected to said third interconnection line of said output accumulator and connected to supply said first input of said processor; and a central controller connected to each of said transfer cells and each of said processors for control of data transfer among said transfer cells, among said processors and between said transfer cells and said corresponding processors, and for simultaneously controlling the operation of each processor to perform the identical function by control of one of said memory, said input accumulator and said output accumulator for supplying data to said bus, control of said memory, said input accumulator and said output accumulator for receiving data from said bus, and control of said predetermined logic combination of said logic element, said central controller further including means adaptive to precalculate a first linear array constant p(j) for all j from 0 to N−1 where $$p(j) = e^{-\pi j^2/N};$$

precalculate a second linear array constant q(j) for all j from 0 to N−1 where $$q(j) = e^{\pi i j^2/N};$$

precalculate a third linear array constant r(j) for all j from 0 to N−1 where $$r(j) = e^{-\pi i j^2/N};$$

load said linear array f(j) into said set of transfer cells whereby the j-th element of f(j) is loaded into the j-th transfer cell;

transfer the element of said linear array f(j) from each transfer cell into said input accumulator of said corresponding processor;

store the element of said first linear array f(j) in said input accumulator into a first memory location of said memory of each processor;

load said first linear array constant p(j) into said set of transfer cells whereby the j-th element of p(j) is loaded into the j-th transfer cell;

transfer the element of said first linear array constant p(j) from each transfer cell into said input accumulator of said corresponding processor;

multiply the element of said first linear array constant p(j) by the corresponding element of said linear array f(j) recalled from said first memory location of said memory in each processor thereby forming a first intermediate linear array $f_1(j)$;

store the element of said intermediate linear array $f_1(j)$ in said first memory location of said memory of said corresponding processor;

load said second linear array constant q(j) into the set of transfer cells whereby the j-th element is loaded into the j-th transfer cell;

transfer the element of said second linear array constant q(j) from each transfer cell into said input accumulator of said corresponding processor;

store the element of said second linear array constant q(j) from said input accumulator into a second memory location of said memory of each processor;

repeat N times recalling from the memory of each processor the corresponding element of the second linear array constant q(j), multiply the element of the first intermediate linear array $f_1(j)$ recalled from said first memory location by the corresponding element of the second linear array constant q(j) recalled from said second memory location of each processor, accumulating the product $f_1(j) \times q(j)$ of each processor into a third memory location of said memory of each processor, and circularly transferring the corresponding element of one of the first intermediate linear array $f_1(j)$ and the corresponding element of the second array constant q(j) of each processor to a selected one of said North and South array neighbor processor in the linear array via respective first and second interconnection lines of said output accumulators, whereby said Northmost and said Southmost processors are coupled together, the final accumulated product forming a second intermediate linear array $f_2(j)$;

load said third linear array constant r(j) into the set of transfer cells whereby the j-th element of is loaded into the j-th transfer cell;

transfer the corresponding element of said third linear array constant r(j) from each transfer cell into the corresponding processor; and multiply the element of said third linear array constant r(j) by the corresponding element of said second intermediate linear array $f_2(j)$ recalled from said first memory location of said memory in each processor, the resulting product being the corresponding element of the desired discrete Fourier transform of the linear array f(j).

2. An apparatus for computing a discrete Fourier transform of a linear array f(j) of N complex number elements where N is an even integer, said apparatus comprising:

a set of N transfer cells disposed in a linear array, each transfer cell connected to its array neighbors and capable of storing therein a complex number;

a set of N processors disposed in a linear array from a Northmost processor to a Soouthmost processor, each processor except said Northmost processor having a North array neighbor, each processor except said Southmost processor having a South array neighbor, and each processor including a memory having an input, an output and an address input, said memory capable of storing a single complex number and capable of recalling a complex number stored therein, an input accumulator capable of storing data therein, said input accumulator having a first interconnection line bidirectionally connected to the corresponding transfer cell for data transfer therebetween, a second interconnection line and an output, a logic element having first and second inputs, said second input connected to said output of said input accumulator, and having an output, said logic element for performing a predetermined logic combination of data received at said first and second inputs and producing resultant data at said output, an output accumulator capable of storing data therein, said output accumulator having first, second and third interconnection lines, said first interconnection line bidirectionally connected to said second interconnection line of said output accumulator of said North array neighbor for data transfer therebetween, said second interconnection line bidirectionally connected to said first interconnection line of said output accumulator of said South array neighbor for data transfer therebetween, said first interconnection line of said output accumulator of said Northmost processor bidirectionally connected to said second interconnection line of said output accumulator of said Southmost processor, said output accumulator further having an input connected to said output of said logic element, and a bus bidirectionally connected to said memory via said input and said output of said memory, bidirectionally connected to said second interconnection line of said input accumulator and bidirectionally connected to said third interconnection line of said output accumulator and connected to supply said first input of said processor; and a central controller connected to each of said transfer cells and each of said processors for control of data transfer among said transfer cells, among said processors and between said transfer cells and said corresponding processors, and for simultaneously controlling the operation of each processor to perform the identical function by control of one of said memory, said input accumulator and said output accumulator for supplying data to said bus, control of said memory, said input accumulator and said output accumulator for receiving data from said bus, and control of said predetermined logic combination of said logic element, said central controller further including means adaptive to precalculate a first linear array constant p(j) for all j from 0 to N−1 where $p(j) = e^{-\pi ij2/N}$;

precalculate a set of N−1 complex number constants $\lambda_1, \lambda_2, \lambda_3, \ldots \lambda_i, \ldots \lambda_{N-1}$ as negatives of corresponding complex roots of the equation $$\sum_{j=0}^{N-1} e^{\pi ij2/N} z^{N-j-1} = 0$$

where z is an arbitrary variable;
precalculate a third linear array constant r(j) for all j from 0 to N−1 where $r(j) = e^{-\pi ij2/N}$;

load said linear array f(j) into said set of transfer cells whereby the j-th element of f(j) is loaded into the j-th transfer cell;
transfer the element of said linear array f(j) from each transfer cell into said input accumulator of said corresponding processor;
store the element of said first linear array f(j) in said input accumulator into said memory of each processor;
load said first linear array constant p(j) into said set of transfer cells whereby the j-th element of p(j) is loaded into the j-th transfer cell;
transfer the element of said first linear array constant p(j) from each transfer cell into said input accumulator of said corresponding processor;
multiply the element of said first linear array constant p(j) by the corresponding element of said linear array f(j) recalled from said memory in each processor thereby forming a first intermediate linear array $f_1(j)$;
store the element of said intermediate linear array $f_1(j)$ in said memory of said corresponding processor;
for each of said precomputed complex number constants $\lambda_1, \lambda_2, \lambda_3, \ldots \lambda_i, \ldots \lambda_{N-1}$ simultaneously form a sum of each element of an intermediate linear array variable $h_n(j)$ with a product of the previous element of said intermediate linear array variable $h_n(j-1)$ and $\lambda_n$, the previous element of the intermediate linear array variable $h_n(0)$ multiplied by $\lambda_1$ in a first sum being the last element of a intermediate linear array variable $h_n(N-1)$, the first intermediate linear array $h_1(j)$ being the first intermediate linear array $f_1(k)$, each sum being the corresponding element of a next intermediate linear array variable $h_{n+1}(j)$, and a last sum being the corresponding element of a second intermediate array variable $f_2(j)$,
store the elements of said second intermediate array variable $f_2(j)$ in said memory of said corresponding processor,
load said third linear array constant r(j) into the set of transfer cells whereby the j-th element of is loaded into the j-th transfer cell;
transfer the corresponding element of said third linear array constant r(j) from each transfer cell into said input accumulator of the corresponding element; and
multiply the element of said third linear array constant r(j) by the corresponding element of said second intermediate linear array $f_2(j)$ recalled from said memory of each processor, the resulting product being the corresponding element of the desired discrete Fourier transform of the linear array f(j).

3. An apparatus for computing a discrete Fourier transform of a planar array f(j,k) of N×M complex number elements where N and M are even integers, said apparatus comprising:
a set of N west transfer cells disposed in a linear array, each west transfer cell connected to its array neighbors and capable of storing therein a complex number;
a set of N east transfer cells disposed in a linear array, each transfer cell connected to its array neighbors and capable of storing therein a complex number;
a set of M north transfer cells disposed in a linear array, each north transfer cell connected to its array neighbors and capable of storing therein a complex number;
a set of M south transfer cells disposed in a linear array, each south transfer cell connected to its array neighbors and capable of storing therein a complex number;
a set of N×M processors disposed in a planar array of N rows and M columns of processors, each of said N rows of processors having a Westmost processor and an Eastmost processor, and each of said M columns of processors having a Northmost processor and a Southmost processor, each processor of each of said N rows except said Westmost processor having a West array neighbor, each processor of each of said N rows except said Eastmost processor having an East array neighbor, each processor of each of said M columns except said Northmost processor having a North array neighbor, each processor of each of said M columns except said Southmost processor having a South array neighbor, each processor including
a memory having an input, an output and an address input, said memory capable of storing a complex number at a memory location corresponding to the address applied to said address input and capable of recalling a complex number stored at a memory location corresponding to the address applied to said address input,
an input accumulator capable of storing data therein, said input accumulator having first, second and third interconnection lines, said first interconnection line bidirectionally connected to said second interconnection line of said input accumulator of the corresponding West array neighbor for data transfer therebetween, said second interconnection line bidirectionally connected to said first interconnection line of said input accumulator of the corresponding East array neighbor, said first interconnection line of said input accumulator of said Westmost processor of each row bidirectionally connected to the corresponding west transfer cell, said second interconnection line of said input accumulator of said Eastmost processor of each row bidirectionally connected to the corresponding east transfer cell, each input accumulator further having an output,
a logic element having first and second inputs, said second input connected to said output of said input accumulator, and having an output, said logic element for performing a predetermined logic combination of data received at said first and second inputs and producing resultant data at said output, an output accumulator capable of storing data therein, said output accumulator having first, second and third interconnection lines, said first interconnection line bidirectionally connected to said second interconnection line of said output accumulator of said North array neighbor for data transfer therebetween, said second interconnection line bidirectionally connected to said first interconnection line of said output accumulator of said South array neighbor for data transfer therebetween, said first interconnection line of said output accumulator of said Northmost processor of each column bidirectionally connected to the corresponding north transfer cell, said second interconnection line of said output accumulator of said Southmost processor of each column bidirectionally connected to the corresponding south transfer cell, each output accumulator further having an input connected to said output of said processor, and a bus bidirectionally connected to said memory via said input and said output of said memory, bidirectionally connected said third interconnection line of said input accumulator and bidirectionally connected to said third interconnection line of said output accumulator and connected to supply said first input of said processor; and a central controller connected to each of said transfer cells and each of said processors for control of data transfer among said transfer cells, among said processors and between said transfer cells and said corresponding processors, and for simultaneously controlling the operation of each processor to perform the identical function by control of one of said memory, said input accumulator and said output accumulator for supplying data to said bus, control of said memory, said input accumulator and said output accumulator for receiving data from said bus, and control of said predetermined logic combination of said logic element, said central controller further including means adaptive to precalculate a first linear array constant $p_n(j)$ for all j from 0 to N−1 where $$p_n(j) = e^{-\pi i j^2/N};$$

precalculate a second linear array constant $q_N(j)$ for all j from 0 to N−1 where $$q_n(j) = e^{\pi i j^2/N};$$

precalculate a third linear array constant $r_N(j)$ for all j from 0 to N−1 where $$r_N(j) = e^{-\pi i j^2/N};$$

precalculate a fourth linear array constant $p_M(k)$ for all k from 0 to M−1 where $$p_M(k) = e^{-\pi i k^2/M};$$

precalculate a fifth linear array constant $q_M(k)$ for all k from 0 to M−1 where $$q_M(k) = e^{\pi i k^2/M};$$

precalculate a sixth linear array constant $r_M(k)$ for all k from 0 to M−1 where $$r_M(j) = e^{-\pi i k^2/M};$$

store the elements of said first planar array f(j,k) in a first memory location of said memory of corresponding processors whereby the element f(j,k) is stored in said memory of the processor of the j-th column and the k-th row;

load said first linear array constant $p_N(j)$ into said input accumulator of said corresponding processor of each column, whereby the j-th element of $p_N(j)$ is loaded into the said input accumulator of each processor of the j-th row;

multiply the element of said first linear array constant $p_N(j)$ by the corresponding element of said planar array f(j,k) recalled from said first memory location of said memory in each processor thereby forming a first intermediate planar array $f_1(j,k)$;

store the element of said first intermediate planar array $f_1(j,k)$ in said first memory location of said memory of each processor;

load said second linear array constant $q_N(j)$ into said input accumulator of said corresponding processor of each column, whereby the j-th element of $p_N(j)$ is loaded into the said input accumulator of each processor of the j-th row;

store the element of said second linear array constant $q_N(j)$ from said input accumulator into a second memory location of said memory of each processor;

repeat N times
 multiplying the element of the first intermediate planar array $f_1(j,k)$ recalled from said first memory location by the corresponding element of the second linear array constant $q_N(j)$ recalled from said second memory location of each processor,
 accumulating the product $f_1(j,k) \times q_N(j)$ of each processor into a third memory location of said memory of each processor, and
 circularly transferring the corresponding element of one of the first intermediate planar array $f_1(j,k)$ and the element of the second array constant $q_N(j)$ of each processor to a selected one of said North and South array neighbor processor, whereby said Northmost and Southmost processors of each of said M columns are coupled together via said corresponding north transfer cells and south transfer cells, the final accumulated product forming a second intermediate planar array $f_2(j,k)$;

load said third linear array constant $r_N(j)$ into said input accumulator of said corresponding processor of each column, whereby the j-th element of $r_N(j)$ is loaded into the said input accumulator of each processor of the j-th row;

multiply the element of said third linear array constant $r_N(j)$ by the corresponding element of said second intermediate planar array $f_2(j,k)$ recalled from said first memory location of said memory in each processor, the resulting product being the corresponding element of a third intermediate planar array $f_3(j,k)$;

load said fourth linear array constant $p_M(k)$ into said input accumulator of said corresponding processor of each row, whereby the k-th element of $p_M(k)$ is loaded into the said input accumulator of each processor of the k-th column;

multiply the element of said first linear array constant $p_M(k)$ by the corresponding element of said planar array $f(j,k)$ recalled from said first memory location of said memory in each processor thereby forming a fourth intermediate planar array $f_4(j,k)$;

store the element of said fourth intermediate planar array $f_4(j,k)$ in said first memory location of said memory of each processor;

load said fifth linear array constant $q_M(k)$ into said input accumulator of said corresponding processor of each row, whereby the k-th element of $p_M(k)$ is loaded into the said input accumulator of each processor of the k-th column;

store the element of said fifth linear array constant $q_M(k)$ from said input accumulator into a second memory location of said memory of each processor;

repeat M times multiplying the element of the fourth intermediate planar array $f_4(j,k)$ recalled from said first memory location by the corresponding element of the fifth linear array constant $q_M(k)$ recalled from said second memory location of each processor, accumulating the product $f_1(j,k) \times q_M(k)$ of each processor into a third memory location of said memory of each processor, and circularly transferring the corresponding element of one of the fourth intermediate planar array $f_4(j,k)$ and the element of the fifth array constant $q_M(k)$ of each processor to a selected one of said West and East array neighbor processor in the same row, whereby said Westmost and Eastmost processors are coupled together via said corresponding west and east transfer cells, the final accumulated product forming a fifth intermediate planar array $f_5(j,k)$;

load said sixth linear array constant $r_M(k)$ to said input accumulator of said corresponding of each row, whereby the k-th element of $r_M(k)$ is loaded into the said input accumulator of each processor of the k-th column;

multiply the element of said sixth linear array constant $r_M(k)$ by the corresponding element of said fifth intermediate planar array $f_5(j,k)$ recalled from said first memory location of said memory in each processor, the resulting product being the corresponding element of the discrete Fourier Transform of the planar array $f(j,k)$.

4. An apparatus for computing a discrete Fourier Transform of a planar array $f(j,k)$ of $N \times M$ complex number elements comprising:

a set of N west transfer cells disposed in a linear array, each west transfer cell connected to its array neighbors and capable of storing therein a complex number;

a set of N east transfer cells disposed in a linear array, each east transfer cell connected to its array neighbors and capable of storing therein a complex number;

a set of M north transfer cells disposed in a linear array, each north transfer cell connected to its array neighbors and capable of storing therein a complex number;

a set of M south transfer cells disposed in a linear array, each south transfer cell connected to its array neighbors and capable of storing therein a complex number;

a set of $N \times M$ processors disposed in a planar array of N rows and M columns of processors, each of said N rows of processors having a Westmost processor and an Eastmost processor, and each of said M columns of processors having a Northmost processor and a Southmost processor, each processor of each of said N rows except said Westmost processor having a West array neighbor, each processor of each of said N rows except said Eastmost processor having an East array neighbor, each processor of each of said M columns except said Northmost processor having a North array neighbor, each processor of each of said M columns except said Southmost processor having a South array neighbor, each processor including a memory having an input, an output and an address input, said memory capable of storing a complex number therein and capable of recalling a complex number therefrom, an input accumulator capable of storing data therein, said input accumulator having first, second and third interconnection lines, said first interconnection line bidirectionally connected to said second interconnection line of said input accumulator of the corresponding West array neighbor for data transfer therebetween, said second interconnection line bidirectionally connected to said first interconnection line of said input accumulator of the corresponding East array neighbor, said first interconnection line of said input accumulator of said Westmost processor of each row bidirectionally connected to the corresponding west transfer cell, said second interconnection line of said input accumulator of said Eastmost processor of each row bidirectionally connected to the corresponding east transfer cell, each input accumulator further having an output, a logic element having first and second inputs, said second input connected to said output of said input accumulator, and having an output, said logic element for performing a predetermined logic combination of data received at said first and second inputs and producing resultant data at said output, an output accumulator capable of storing data therein, said output accumulator having first, second and third interconnection lines, said first interconnection line bidirectionally connected to said second interconnection line of said output accumulator of said North array neighbor for data transfer therebetween, said second interconnection line bidirectionally connected to said first interconnection line of said output accumulator of said South array neighbor for data transfer therebetween, said first interconnection line of said output accumulator of said Northmost processor of each column bidirectionally connected to the corresponding north transfer cell, said second interconnection line of said output accumulator of said Southmost processor of each column bidirectionally connected to the corresponding south transfer cell, each output accumulator further having an input connected to said output of said processor, and a bus bidirectionally connected to said memory via said input and said output of said memory, bidirectionally connected said third interconnection line of said input accumulator and bidirectionally connected to said third interconnection line of said output accumulator and connected to supply said first input of said processor; and a central controller connected to each of said transfer cells and each of said processor elements for control of data transfer among said transfer cells, among said processors and between said transfer cells and said corresponding processors, and for simultaneously controlling the operation of each processor to perform the identical function by control of one of said memory, said input accumulator and said output accumulator for supplying data to said bus, control of said memory, said input accumulator and said output accumulator for receiving data from said bus, and control of said predetermined logic combination of said logic element, said central controller further including means adaptive to precalculate a first linear array constant $p_N(j)$ for all j from 0 to $N-1$ where $$p_n(j) = e^{-\pi i j2/N};$$

precalculate a set of $N-1$ complex number constants $\lambda_{N1}, \lambda_{N2}, \lambda_{N3}, \ldots \lambda_{Ni}, \ldots \lambda_{NN-1}$ as negatives of corresponding complex roots of the equation $$\sum_{j=0}^{N-1} e^{\pi i j2/N} z^{N-j-1} = 0$$

where z is an arbitrary variable;
precalculate a second linear array constant $r_N(j)$ for all j from 0 to $N-1$ where $$r_N(j) = e^{-\pi i j2/N};$$

precalculate a third linear array constant $p_M(k)$ for all k from 0 to $M-1$ where $$p_M(j) = e^{-\pi i j2/N};$$

precalculate a set of $M-1$ complex number constants $\lambda_{M1}, \lambda_{M2}, \lambda_{M3}, \ldots \lambda_{Mi}, \ldots \lambda_{MM-1}$ as negatives of corresponding complex roots of the equation $$\sum_{j=0}^{M-1} e^{\pi i j2/M} z^{M-j-1} = 0$$

where z is an arbitrary variable;
precalculate a fourth linear array constant $r_M(k)$ for all k from 0 to $M-1$ where $$r_M(k) = e^{-\pi i k2/M};$$

store the elements of said first planar array $f(j,k)$ in said memory of the corresponding processors whereby the element $f(j,k)$ is stored in said memory of the processor of the j-th column and the k-th row;

load said first linear array constant $p_N(j)$ into said input accumulator of said corresponding processor of each column, whereby the j-th element of $p_N(j)$ is loaded into the said input accumulator of each processor of the j-th row;

multiply the element of said first linear array constant $p_N(j)$ by the corresponding element of said planar array $f(j,k)$ recalled from said memory of each processor thereby forming a first intermediate planar array $f_1(j,k)$;

store the element of said first intermediate planar array $f_1(j,k)$ in said memory of each processor;

for each of said precomputed complex number constants $\lambda_{N1}, \lambda_{N2}, \lambda_{N3}, \ldots \lambda_{Ni}, \ldots \lambda_{NN-1}$
load the constant $\lambda_{Nn}$ into each processor,
simultaneously form a sum of each element of an intermediate planar array variable $h_{Nn}(j,k)$ with a product of the previous row element of said intermediate planar array variable $h_{Nn}(j-1,k)$ and $\lambda_{Nn}$, the previous row element of the intermediate planar array variable $h_{Nn}(0,k)$ multiplied by $\lambda_{N1}$ in a first sum being the last row element of the intermediate planar array variable $h_{Nn}(N-1,k)$, a first intermediate planar array $h_1(j,k)$ being the first intermediate planar array $f_1(j,k)$, each sum being the corresponding element of a next intermediate planar array variable $h_{Nn+1}(j,k)$, and a last sum being the corresponding element of a second intermediate array variable $f_2(j,k)$,
load said second linear array constant $r_N(j)$ into said input accumulator of said corresponding processor of each column, whereby the j-th element of $r_N(j)$ is loaded into the said input accumulator of each processor of the j-th row;

multiply the element of said second linear array constant $r_N(j)$ by the corresponding element of said second intermediate planar array $f_2(j,k)$ recalled from said memory in each processor, the resulting product being the corresponding element of a third intermediate planar array $f_3(j,k)$;

load said third linear array constant $p_M(k)$ into said input accumulator of said corresponding processor of each row, whereby the k-th element of $p_M(k)$ is loaded into the said input accumulator of each processor of the k-th column;

multiply the element of said third linear array constant $p_M(k)$ by the corresponding element of said third intermediate planar array $f_3(j,k)$ recalled from said memory in each processor thereby forming a fourth intermediate planar array $f_4(j,k)$;

store the element of said fourth intermediate planar array $f_4(j,k)$ in said memory of each processor;

for each of said precomputed complex number constants $\lambda_{M1}, \lambda_{M2}, \lambda_{M3}, \ldots \lambda_{Mi}, \ldots \lambda_{MM-1}$
load the constant $\lambda_{Mn}$ into each processor,
simultaneously form a sum of each element of an intermediate planar array variable $h_{Mn}(j,k)$ with a product of the previous column element of said intermediate planar array variable $h_{Mn}(j,k-1)$ and $\lambda_{Mn}$, the previous column element of the intermediate planar array variable $h_{Mn}(0,k)$ multiplied by $\lambda_{M1}$ in a first sum being the last column element of the intermediate planar array variable $h_{Mn}(j,M-1)$, a first intermediate planar array $h_1(j,k)$ being the fourth intermediate planar array $f_4(j,k)$, each sum being the corresponding element of a next intermediate planar array variable $h_{Mn+1}(j,k)$, and a last sum being the corresponding element of a fifth intermediate array $f_5(j,k)$,
load said fourth linear array constant $r_M(k)$ into said input accumulator of said corresponding processor of each column, whereby the k-th element of $r_M(k)$ is loaded into the said input accumulator of each processor of the k-th row;

multiply the element of said fourth linear array constant $r_M(k)$ by the corresponding element of said fifth intermediate planar array $f_5(j,k)$ recalled from said memory in each processor, the resulting product being the corresponding element of the discrete Fourier Transform of the planar array $f(j,k)$.

* * * * *

UNITED STATES PATENT AND TRADEMARK OFFICE
CERTIFICATE OF CORRECTION

PATENT NO. : 5,109,356
DATED : April 28, 1992
INVENTOR(S) : Wayne Lawton It is certified that error appears in the above-identified patent and that said Letters Patent is hereby corrected as shown below:

Column 7, Line 43, Delete "100,N-1" Insert --$10_0$,N-1--

Column 7, Line 59, Delete "100,N-1" Insert --$10_0$,N-1--

Column 8, Line 1, Delete "100,N-1" Insert --$10_0$,N-1--

Column 8, Line 12, Delete "2N-311" Insert --2N-1--

Column 8, Line 20, Delete "$0 \leq j \leq N-1$" Insert ---$0 \leq j \leq N-1$--

Column 9, Line 24, Delete "5b" Insert --5d--

Column 11, Line 1, Delete "$j \geq 1$" Insert --$j \geq 1$--

Column 14, Line 27, Delete "memory line" Insert --memory via--

UNITED STATES PATENT AND TRADEMARK OFFICE
CERTIFICATE OF CORRECTION

PATENT NO. : 5,109,356

DATED : April 28, 1992

INVENTOR(S) : Wayne Lawton

It is certified that error appears in the above-identified patent and that said Letters Patent is hereby corrected as shown below:

Column 17, Line 63, Delete "corresponding element" Insert --corresponding processor--.

Column 18, Line 12, Delete "each transfer" Insert --each transfer east--.

Column 20, Line 3, Delete "rm(j)=" Insert --rm(K)--.

Column 21, Line 40, Delete "to said" Insert --into said--.

Signed and Sealed this

Nineteenth Day of October, 1993

Attest:

BRUCE LEHMAN

*Attesting Officer*   *Commissioner of Patents and Trademarks*